(12) United States Patent
Vallius

(10) Patent No.: US 8,690,341 B2
(45) Date of Patent: Apr. 8, 2014

(54) IMAGE PROJECTOR AND AN ILLUMINATING UNIT SUITABLE FOR USE IN AN IMAGE PROJECTOR

(75) Inventor: Tuomas Vallius, Tampere (FI)

(73) Assignee: EpiCrystals Oy, Tampere (FI)

( * ) Notice: Subject to any disclaimer, the term of this patent is extended or adjusted under 35 U.S.C. 154(b) by 108 days.

(21) Appl. No.: 13/203,834

(22) PCT Filed: Feb. 18, 2010

(86) PCT No.: PCT/FI2010/050106
§ 371 (c)(1),
(2), (4) Date: Aug. 29, 2011

(87) PCT Pub. No.: WO2010/097505
PCT Pub. Date: Sep. 2, 2010

(65) Prior Publication Data
US 2011/0310356 A1 Dec. 22, 2011

(30) Foreign Application Priority Data
Feb. 27, 2009 (FI) .................................... 20095197

(51) Int. Cl.
*G03B 21/26* (2006.01)
(52) U.S. Cl.
USPC .................. 353/30; 353/31; 353/34; 353/38; 353/94; 353/98; 359/558; 359/566
(58) Field of Classification Search
USPC ......... 353/30–31, 34, 38, 81, 88, 94, 98, 122; 369/112.04, 121, 112.07, 112.12, 120; 372/102, 96, 22; 359/34, 13, 15, 359/558–576; 349/5, 7–9, 96, 201–202
See application file for complete search history.

(56) References Cited

U.S. PATENT DOCUMENTS

| 4,274,706 A | 6/1981 | Tangonan |
| 7,177,340 B2* | 2/2007 | Lang et al. .................... 372/102 |
| 2002/0097660 A1* | 7/2002 | Komma et al. .......... 369/112.04 |
| 2005/0163512 A1 | 7/2005 | Tayebati et al. |
| 2006/0098128 A1* | 5/2006 | Conner et al. .................... 349/5 |
| 2007/0127123 A1* | 6/2007 | Brown et al. ................. 359/556 |

FOREIGN PATENT DOCUMENTS

| DE | 3602055 A1 | 7/1987 |
| JP | 2006189728 A | 7/2006 |

OTHER PUBLICATIONS

PCT/ISA/210—International Search Report—Jun. 9, 2010.
PCT/ISA/237—Written Opinion of the International Searching Authority—Jun. 9, 2010.
PCT/IPEA/409—International Preliminary Report on Patentability—April 13, 2011.

* cited by examiner

*Primary Examiner* — Sultan Chowdhury
(74) *Attorney, Agent, or Firm* — Venable LLP; Eric J. Franklin

(57) ABSTRACT

An image display device having an RGB illuminating module that includes a diffractive beam combiner. The diffractive beam combiner includes a first light source arranged to provide a first light beam having red color and a second light source arranged to provide a second light beam having green color. A centerline of the first light beam and a centerline of the second light beam are arranged to intersect at an intersection point. A diffractive output grating is located in the vicinity of the intersection point. The diffractive output grating is arranged to form an output light beam by diffracting light of the first light beam and light of the second light beam substantially in the same direction.

15 Claims, 14 Drawing Sheets

IMAGE PROJECTOR AND AN ILLUMINATING UNIT SUITABLE FOR USE IN AN IMAGE PROJECTOR

CROSS-REFERENCE TO RELATED APPLICATIONS

This application claims priority to Finnish patent application 20095197 filed 27 Feb. 2009 and is the national phase under 35 U.S.C. §371 of PCT/FI2010/050106 filed 18 Feb. 2010.

FIELD OF THE INVENTION

The present invention relates to image display devices. The invention also relates to a light source suitable for use in an image display device.

BACKGROUND

It is known that image projectors may comprise a spatial light modulator, a light source, which is arranged to emit white light, and a rotating filter wheel. The spatial modulator is sequentially illuminated with light having different colors so as to display a multi-color image. The sequentially changing color of the illuminating light is provided by filtering white light by the rotating filter wheel. However, the filtering wastes optical power.

It is known to use three separate light sources and three separate spatial light modulators may be used, wherein each light source is arranged to illuminate its own light modulator with a different color. The colors may be e.g. red, green, and blue (RGB). Images formed by the different spatial light modulators may be combined so as to form a single multi-color image.

The spatial light modulator may be e.g. a LCD array (Liquid crystal), an LCoS array (Liquid Crystal on Silicon), or a MEMS array (Micro Electro-mechanical System) comprising e.g. a plurality of micromechanically movable miniature mirrors.

Light beams of three separate light sources may be combined into a single combined beam by using a beam combiner, which comprises wavelength-selective mirrors. The combined beam may be arranged to illuminate a spatial light modulator. The color of the combined beam may be sequentially changed by modulating the optical power of the separate light sources. The wavelength selective mirrors of the beam combiner may be implemented by multilayer coatings.

However, several different materials and manufacturing processes may be needed to produce the wavelength-selective mirrors. Furthermore, tolerances for positioning the wavelength-selective mirrors with respect to the light sources may be tight.

SUMMARY

The object of the invention is to provide a beam combiner. An object of the invention is to provide an illuminating unit comprising a beam combiner. An object of the invention is to provide an image display device comprising said illuminating unit.

According to a first aspect of the invention, there is provided a display device.

According to a second aspect of the invention, there is provided a method for displaying images.

According to a third aspect of the invention, there is provided a beam combiner.

According to fourth aspect of the invention, there is provided a method for combining light beams.

The beam combiner to the invention may be implemented by using only a small number of different materials and manufacturing processes.

By using the illuminating unit according to the invention, relatively large manufacturing tolerances may be allowed.

By using the illuminating unit according to the invention, a compact and/or stable image display device may be provided.

By using the illuminating unit according to the invention, a single spatial light modulator may be arranged to display multi-color images at a high optical efficiency.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings in which.

DETAILED DESCRIPTION

Figure 1A:
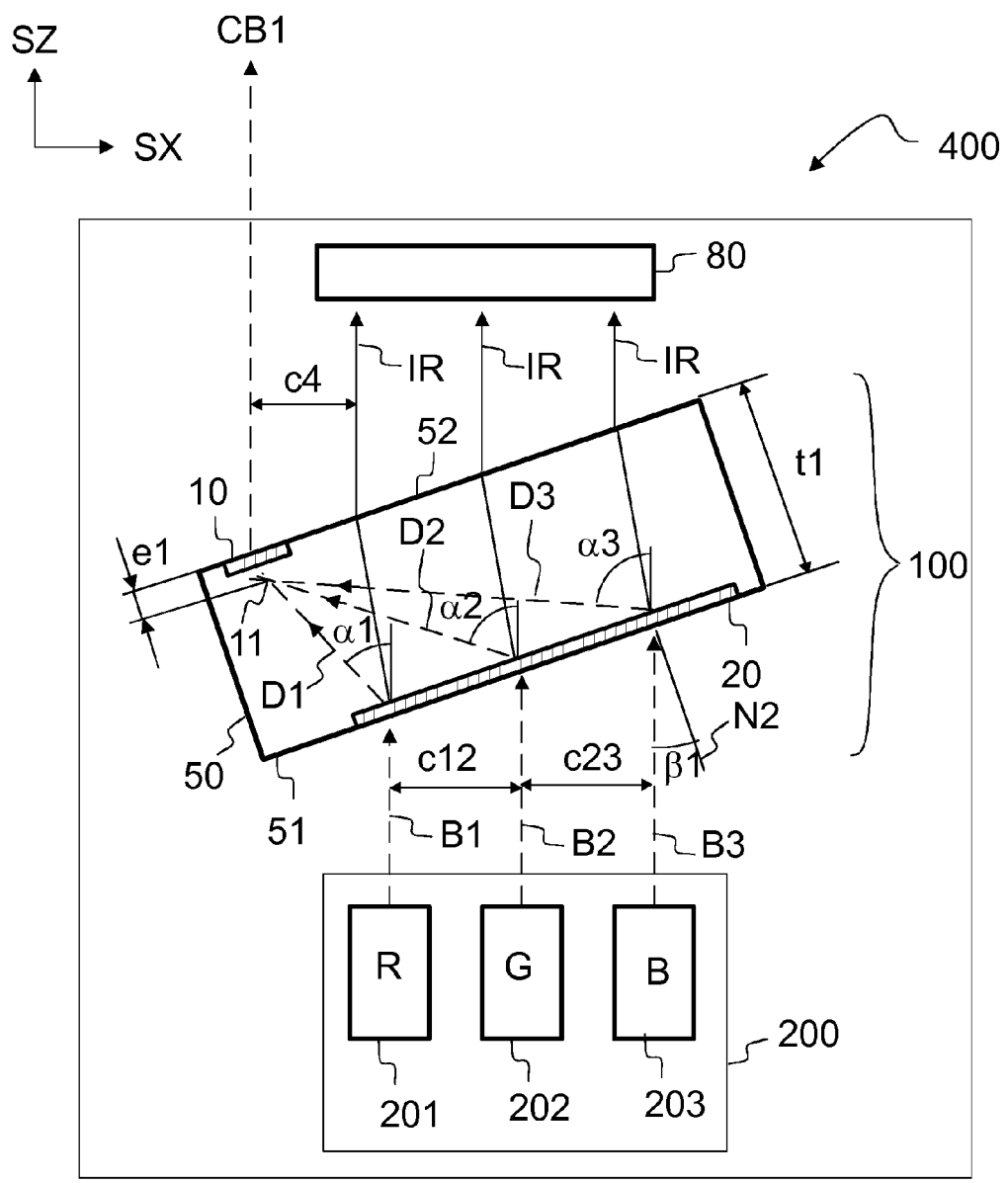
FIG. 1a shows an illuminating unit comprising a diffractive beam combiner.

Referring to FIG. 1a, an illumination unit 400 may comprise two or more light sources 201, 202, 203, and a diffractive beam combiner 100. A first light source 201 is arranged to emit light having a first color, e.g. red color R, and a second light source is arranged to emit light having a second color, e.g. green color G. In addition, the illumination unit 400 may comprise a third light source 203 arranged to emit e.g. blue color B.

The first light source is arranged to provide a first light beam B1, the second light source is arranged to provide a second light beam B2, and the third light source is arranged to provide a third light beam B3. The light beams B1, B2, B3 may be spatially separate.

The beam combiner 100 may comprise a diffractive output grating 10 and a diffractive input grating 20 implemented on a substantially transparent body 50.

The input beams B1, B2, B3 may impinge on the input grating 20, which may be arranged to form a first diffracted beam D1 by diffracting light of the first beam B1, to form a second diffracted beam D2 by diffracting light of the second beam B2, and to form a third diffracted beam by diffracting light of the third beam B3 such that the diffracted beams D1, D2, D3 intersect substantially in the vicinity of the output grating 10. In other words, the centerlines of the diffracted beams D1, D2 may be arranged to intersect in the vicinity of a point 11, which is in the vicinity of the output grating 10. The symbol e1 denotes a distance between the intersection point 11 and the output grating 10. The distance e1 is preferably smaller than or equal to 50% of the FWHM width w1 of the beam B1 (See FIG. 1b). FWHM width means that the width is determined by points where intensity of the beam B1 reaches 50% of its maximum intensity. FWHM is an acronym for full width at half maximum.

The first diffracted beam D1 may have the same color, i.e. substantially the same visible wavelength band as the first beam B1. The second diffracted beam D2 may have the same color as the second beam B2. The third diffracted beam D2 may have the same color as the third beam B2.

The output grating 10 may be arranged to form an output beam CB1 by diffracting light of the first diffracted beam D1 and by diffracting light of the second diffracted beam D2 in the same direction, which is herein marked by the symbol SZ.

Now, because the intersection point 11 is in the vicinity of the output grating 10, the output beam CB1 is formed of two or more parallel light beams, which overlap at least partially. The output beam CB1 is preferably formed of two or more parallel light beams, which overlap substantially completely. If both light sources 201, 202 are emitting simultaneously, then the light of the output beam CB1 comprises a first wavelength band emitted by the first light source 201 and a second wavelength band emitted by the second light source 202.

Thus illuminating device 400 may comprise:
a first light source 201 arranged to provide a first diffracted light beam D1 having a first color R,
a second light source 202 arranged to provide a second diffracted light beam D2 having a second color G, wherein the centerline of said first diffracted beam D1 and the centerline of said second diffracted beam D2 are arranged to intersect at an intersection point 11, and
a diffractive output grating 10 located in the vicinity of said intersection point 11, wherein said diffractive output grating 10 is arranged to form an output light beam CB1 by diffracting light of said first diffracted beam D1 and light of said second diffracted beam D2 substantially in the same direction SZ.

It should be noted that the light sources 201, 202, 203 may also be arranged to emit light in a sequential order. When the light sources 201, 202, 203 emit light sequentially, the output beam CB1 may consist of the visible light emitted by only one light source at a time. If the light sources 201, 202, 203 are operated sequentially by modulating their optical power, then the color of the output beam CB1 may vary, respectively.

The output grating 10 directs diffracted light D1, D2, D3 originating from the different light sources 201, 202, 203 substantially along the same path in the direction SZ, i.e. along the path of the output beam CB1.

Figure 12A:
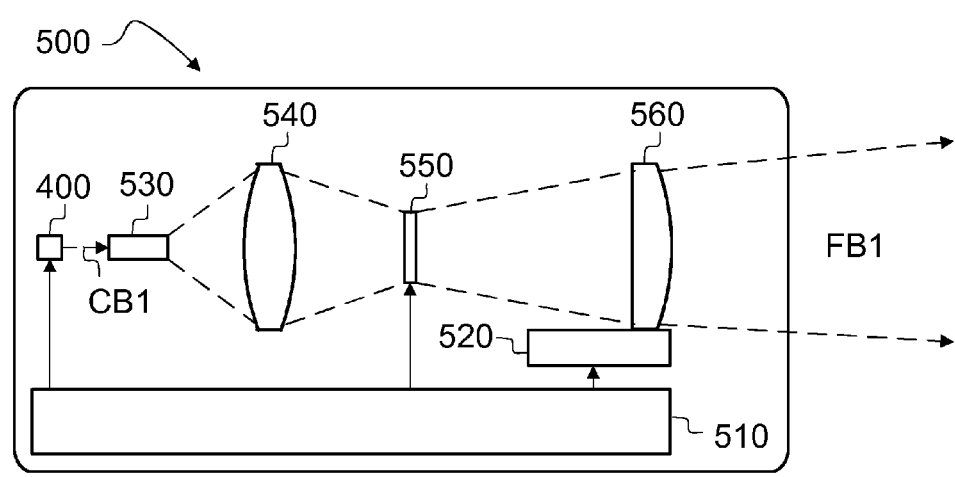
FIG. 12a shows an image display device comprising an illuminating unit and a two-dimensional light modulator array.
Figure 12B:
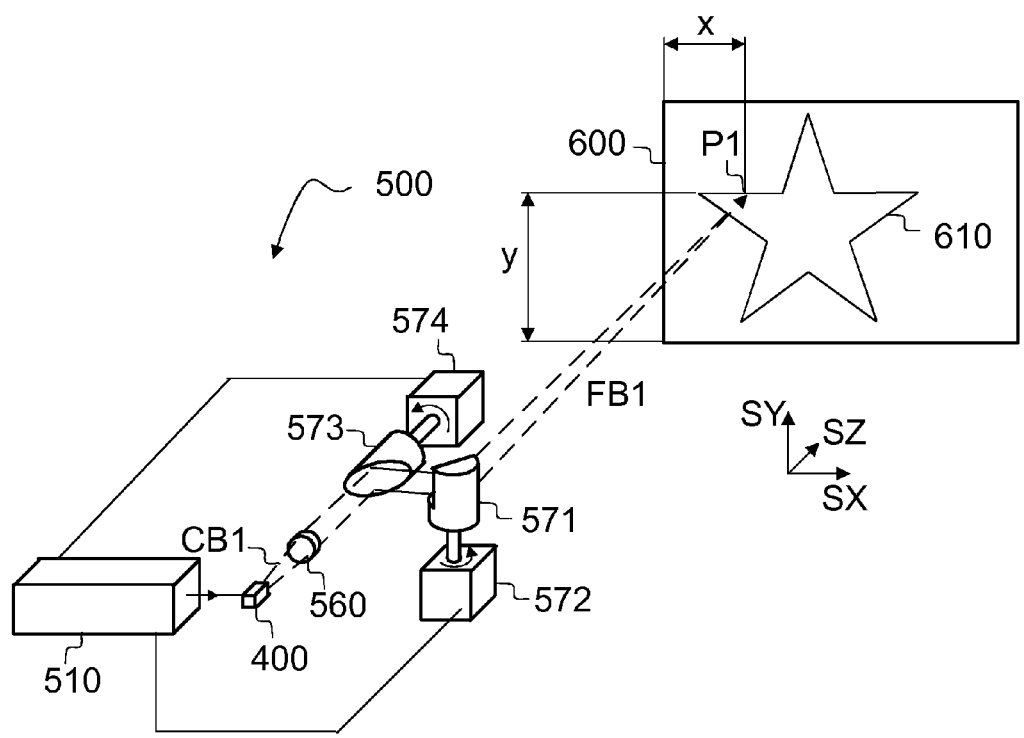
FIG. 12b shows, in a three-dimensional view, an image projector comprising an illuminating unit and a beam steering unit.

Directions SX and SY are perpendicular to the direction SZ (See FIG. 12b). The direction SX is perpendicular to the direction SY.

Figure 4A:
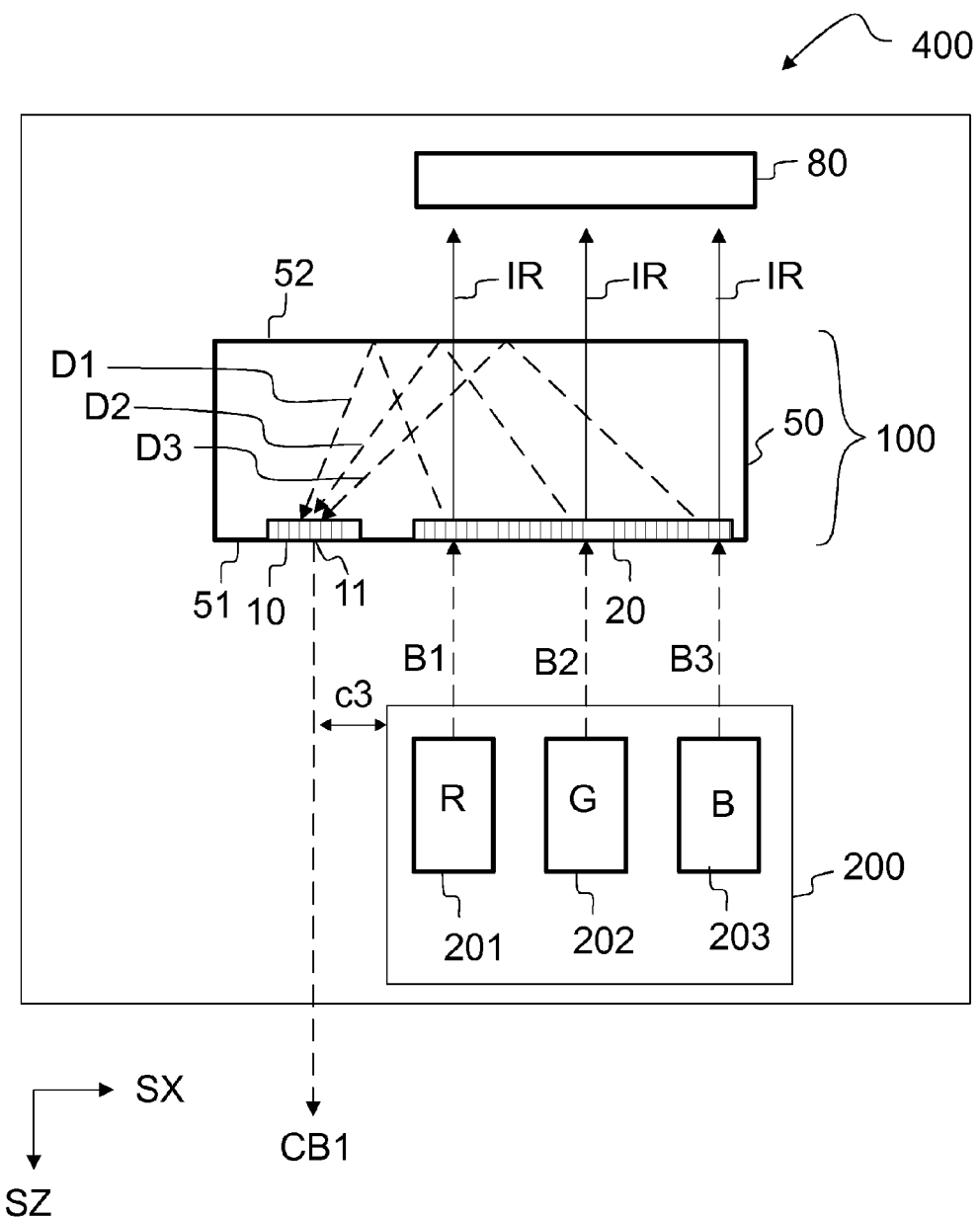
FIG. 4a shows an illuminating unit comprising a backwards-reflecting diffractive beam combiner.
Figure 4B:
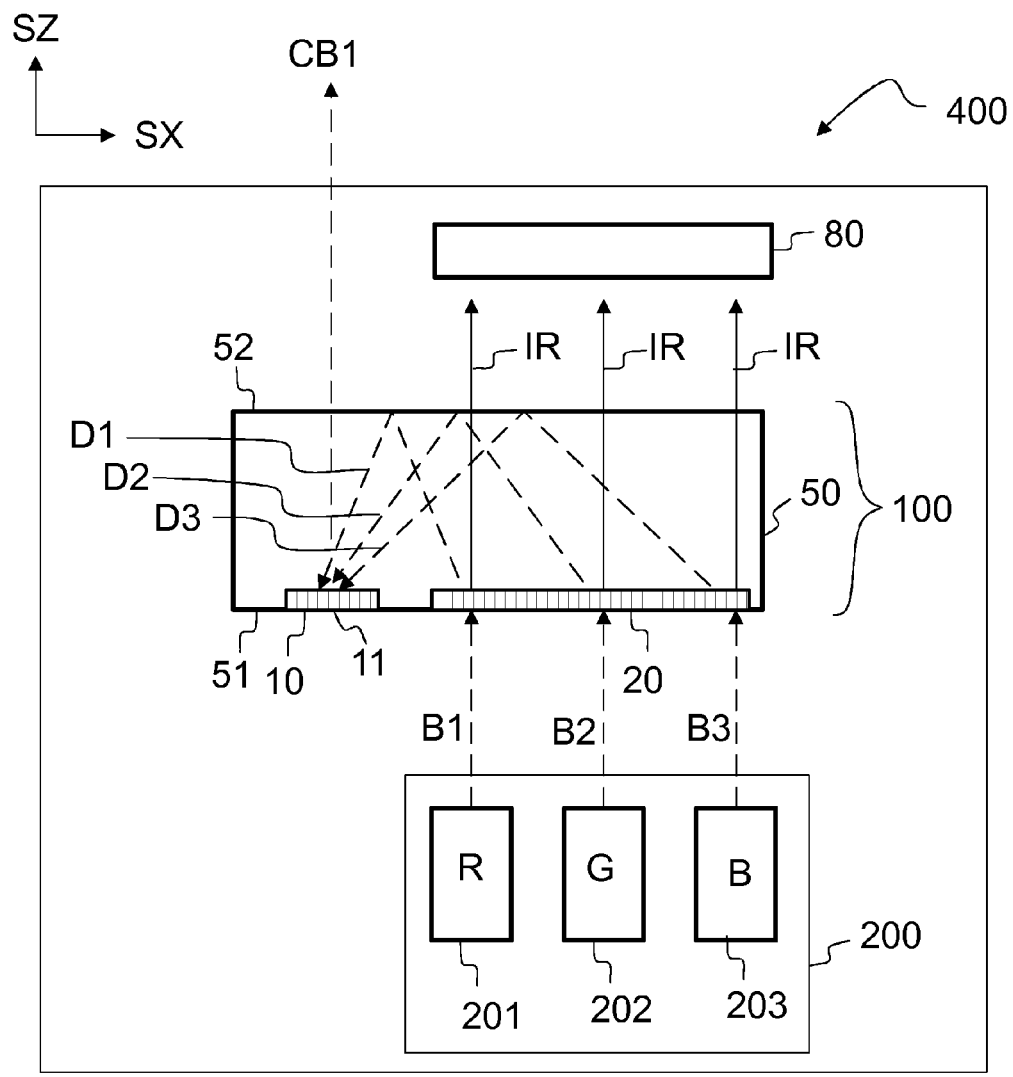
FIG. 4b shows an illuminating unit comprising a diffractive beam combiner, which has a reflective grating.
Figure 4C:
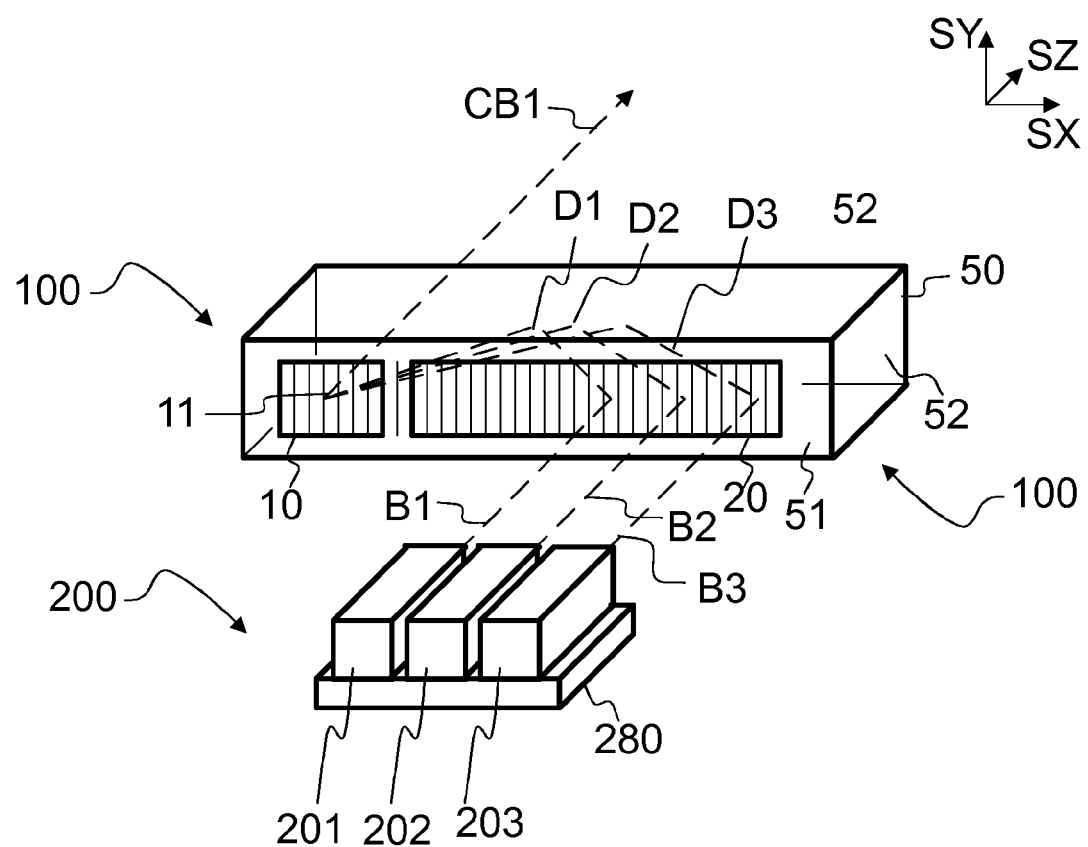
FIG. 4c shows, in a three dimensional view, propagation of light beams in the beam combiner of FIG. 4b.

The light sources 201, 202, 203 may be implemented on a common base (FIG. 4c). A light module 200 may comprise two or more light sources 201, 202, 203.

The light module 200 may be arranged to provide two or more substantially parallel input light beams B1, B2, B3. The input beams B1, B2, B3 may be substantially parallel and/or substantially collimated.

The symbol c12 denotes a distance between the first beam B1 and the second beam B2. The symbol c23 denotes a distance between the second beams B2 and the third beam B3.

For predetermined wavelengths of the beams B1, B2, the distance e1 between the intersection point 11 and the level of the output grating may be minimized e.g. by:
selecting a distance t1 between the output grating 10 and the input grating 20,
selecting the refractive index of the body 50,
selecting the distance c12 between the beams B1, B2,
selecting a grating period $d_{20}$ of the input grating 20, and
selecting an angle β1 between the normal N2 of the input grating and the direction of the output beam CB1.

Typically, the angle β1 may be rather easily tuned in the manufacturing phase.

The light sources 201, 202, 203 may also emit infrared radiation IR, in addition to emitting visible light. In some applications, it may be advantageous to separate the infrared radiation IR from the visible light. The input grating 20 may be arranged such that is has low diffraction efficiency for infrared light. Consequently, IR light may be merely refracted at the surface 51 of the transparent body 50, without being diffracted towards the intersection point 11. IR light may be subsequently transmitted through the surface 52 of the transparent body 50. Thus, the visible light of the light sources 201, 202, 203 may be spatially separated from infrared light. The symbol c4 denotes a distance between the output beam CB1 and the closest infrared light beam IR. The IR light may be transmitted through a portion of the surface 52 of the transparent body 50, which does not have a grating structure. Alternatively, the output grating 10 may also have a low diffraction efficiency for IR light. If desired, the IR light may be absorbed by a beam dump 80. The beam dump 80 may be e.g. a piece of light-absorbing material, which has been glued onto the surface 51 of the transparent body 50.

The beam combiner 100 may comprise a reflective surface or a further grating arranged to direct the IR light into a direction where it does not cause harm.

In order to simplify manufacturing of the beam combiner 100, the input grating 20 may consist of a single grating area having substantially the same grating period over said single grating area.

Figure 6:
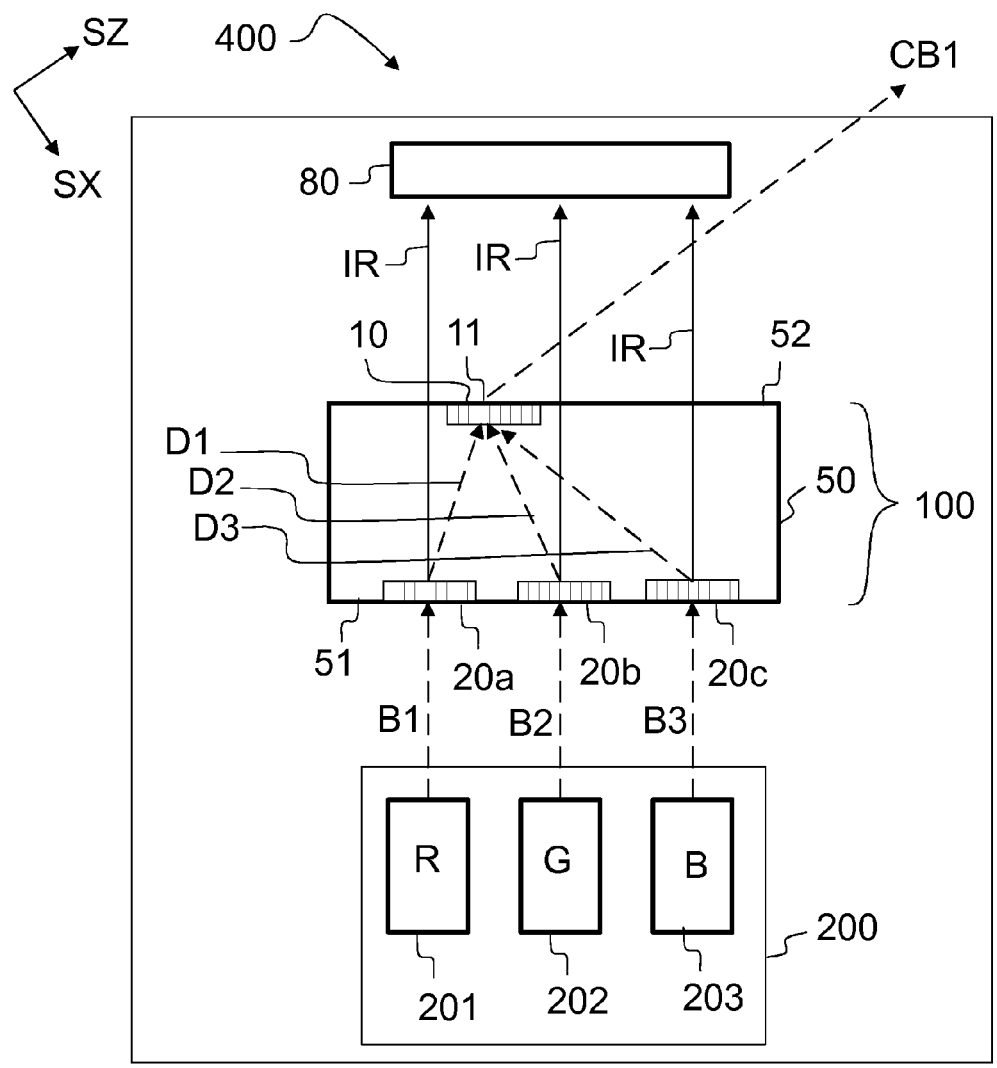
FIG. 6 shows an illuminating unit comprising a diffractive beam combiner, which has grating portions arranged to diffract light of input beams towards an intersection point.

Alternatively, the beam combiner 100 may comprise two or more grating portions 20a, 20b, 20c arranged to form the diffracted beams D1, D2, D3 (see FIG. 6). The different grating portions 20a, 20b, 20c may have different grating periods. For predetermined wavelengths of the diffracted beams D1, D2, D3, the grating portions 20a, 20b, 20c may provide an additional degree of freedom for designing the beam combiner 100 such that the diffracted beams D1, D2, D3 can be arranged to intersect at the same point 11.

The diffractive features of the output grating 10 and/or input grating 20 may vary as a function of the location in order to shape the intensity distributions of the beams, e.g. to focus a beam.

The grating profile of the grating 20 may be selected to provide a high diffraction efficiency e.g. in the direction of the first diffracted beam D1 for the color of the first diffracted beam D1. The grating profile may be e.g. blazed or slanted.

The gratings 10, 20 shown in FIG. 1a are transmissive. However, the output grating 10 and/or the input grating 20 may also be reflective.

The gratings 10, 20 may be e.g. embossed gratings having a relief pattern. The gratings 10, 20 may comprise a plurality of substantially linear diffractive features, e.g. ridges and/or grooves. The substantially linear diffractive features may be substantially perpendicular to the directions SX and SZ.

The gratings 10, 20 may be located on surfaces 51, 52 of a substantially transparent body 50. The gratings 10, 20 may also be embedded in the body 50. Covered gratings may be better protected from wear and contamination, but exposed relief gratings on the external surface of a transparent body typically provide higher diffraction efficiency. Exposed means herein that the diffraction takes place on a gas-solid interface.

The input grating 20 may be arranged to diffract the diffracted light beams D1, D2 e.g. in the first diffraction order. The output grating may be arranged to diffract the output beam CB1 e.g. in the first diffraction order.

In general, the gratings 10, 20 may be microstructured surfaces, whose surface profile is e.g. binary, sinusoidal, triangular, or slanted. The gratings 10, 20 may be microstructured surfaces, which are periodic, piece vise periodic, or completely non-periodic.

$\alpha 1$ denotes an angle between the first diffracted beam D1 and the direction of the output beam CB1. $\alpha 2$ denotes an angle between the first diffracted beam D2 and the direction of the output beam CB1. $\alpha 3$ denotes an angle between the first diffracted beam D3 and the direction of the output beam CB1.

The light beams B1, B2, B3 may be substantially collimated and/or substantially parallel.

In particular, the output grating 10 and/or the input grating 20 may be substantially planar, the output grating 10 may be substantially parallel to the input grating 20, and the grating period of the output grating 10 may be substantially equal to the grating period of the input grating 20. When these conditions are fulfilled, the output beam CB1 may propagate substantially in the same direction as the input beams B1, B2, B3 provided by the light sources 201, 202, 203, regardless of variations in the input angle $\beta 1$, and regardless of variations in the wavelength of the beams B1, B2, B3. In other words, larger manufacturing tolerances may be allowed for the color of the light sources 201, 202, 203, and for positioning the beam combiner 100 with respect to the light sources 201, 202, 203. In addition, because the angular orientation of the beam combiner 100 does not affect the direction of the output beam CB1, the angle $\beta 1$ may be varied so as to minimize the width wCB of the output beam CB1 in the direction SX. Furthermore, because variations in the wavelength of the beams B1, B2, B3 do not affect the direction of the output beam CB1, the beam combiner 100 may provide a collimated beam also when the beams B1, B2, B3 have a substantially wide wavelength range.

Figure 1B:
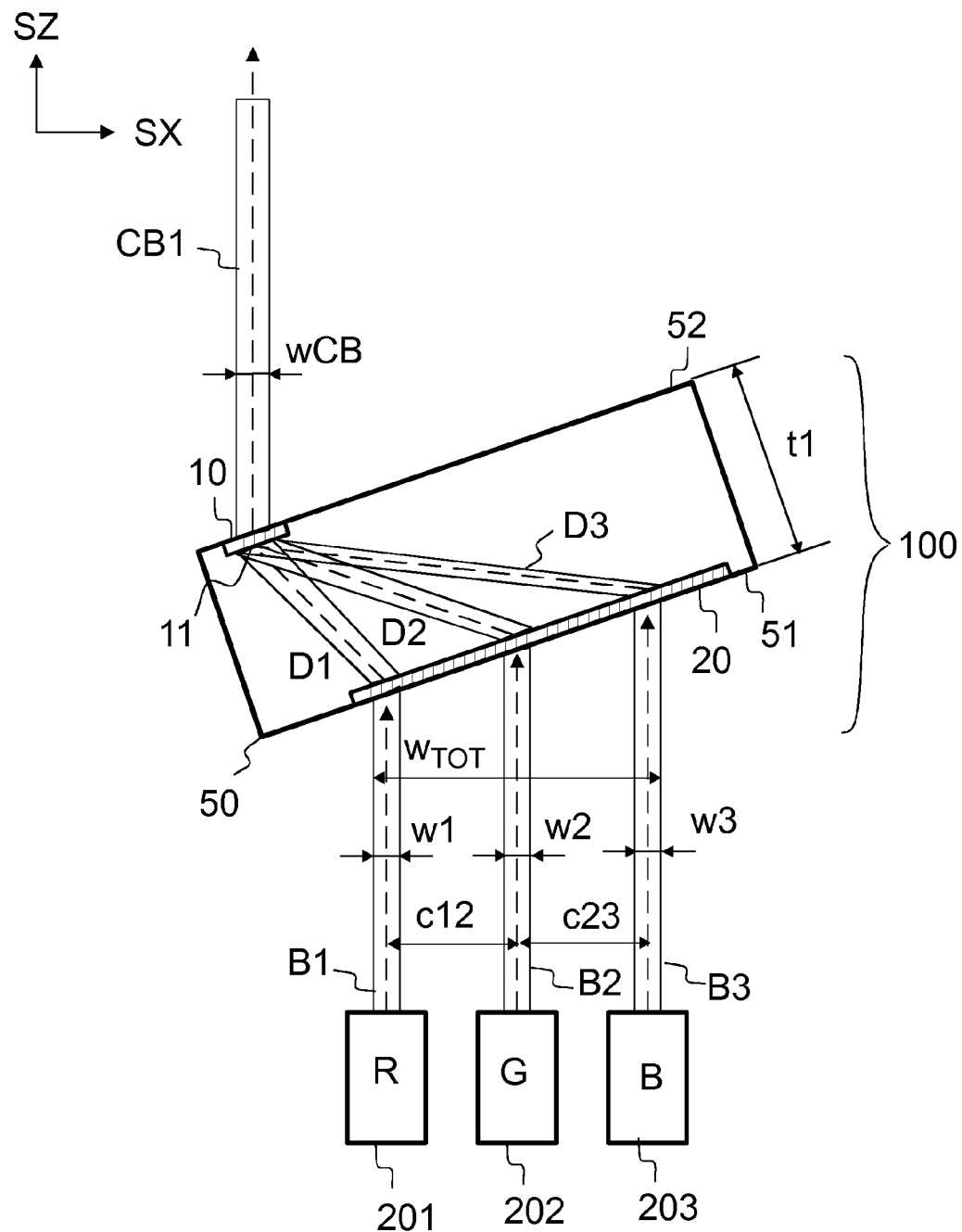
FIG. 1b shows the widths of input light beams impinging on the diffractive beam combiner and the width of n output light beam coupled out of the beam combiner.

Referring to FIG. 1b, the first input beam B1 has a width w1, the second input beam B2 has a width w2, and the third input beam has a width w3. The centerlines of the input beams B1, B2, B3 are separated by the distances C12 and C23. The total width of the input beams B1, b2, B3 in the direction SX is $W_{TOT}$ (in this case $w_{TOT}$=w1/2+C12+C23+w3/2). The output beam CB1 has a width wCB. The widths w1, w2, w3, and wCB are FWHM widths (the definition of the FWHM width was discussed in above in the context of FIG. 1). In case of parallel input beams B1, B2, the width wCB of the output beam cB1 may be e.g. smaller than or equal to the distance c12 between the centerlines of the first input beam B1 and the second input beam B2, preferably smaller than or equal to 20% of the distance c12.

The diffracted beam D1 may be slightly diverging due to non-zero width of the wavelength band of the input beam B1. The same applies to the diffracted beams D2 and D3. Consequently, the width wCB of the output beam cB1 may be greater than the width w1 of the first input beam B1.

The width wCB of the output beam CB1 may be minimized by setting the distance e1 between the intersection point 11 and the output grating 10 substantially equal to zero.

Figure 2:
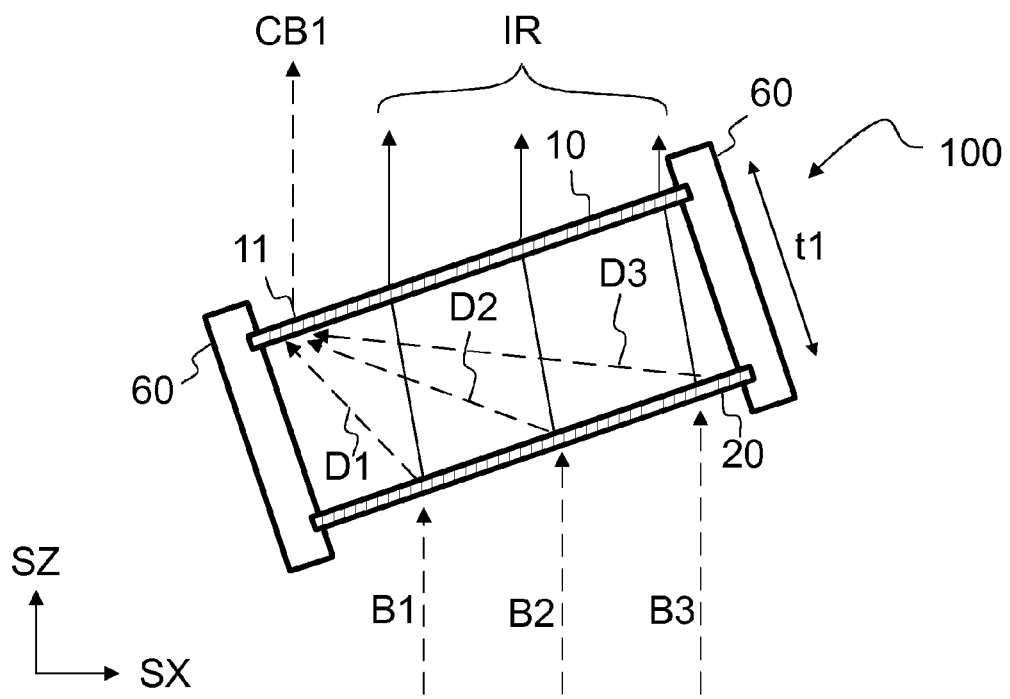
FIG. 2 shows a diffractive beam combiner comprising two gratings supported by a holder.

FIG. 2 shows a beam combiner 100, where the output grating 10 and the input grating 20 may be positioned by one or more supporting structures 60. In particular, the beam combiner 100 may be hollow. The beam combiner of FIG. 1a may be replaced with the beam combiner of FIG. 2.

The output grating 10 and/or the input grating 20 may be fixed to the supporting structure 60 e.g. by glue, which is curable by ultraviolet light. The supporting structures 60 may be arranged to allow adjusting the distance t1 between the gratings at least before the position of the output grating 10 and/or the position of the input grating 20 is permanently fixed.

On the other hand a beam combiner 100 comprising gratings implemented on surfaces 51, 52 of a transparent body may be more stable and/or cheaper to manufacture.

Figure 3:
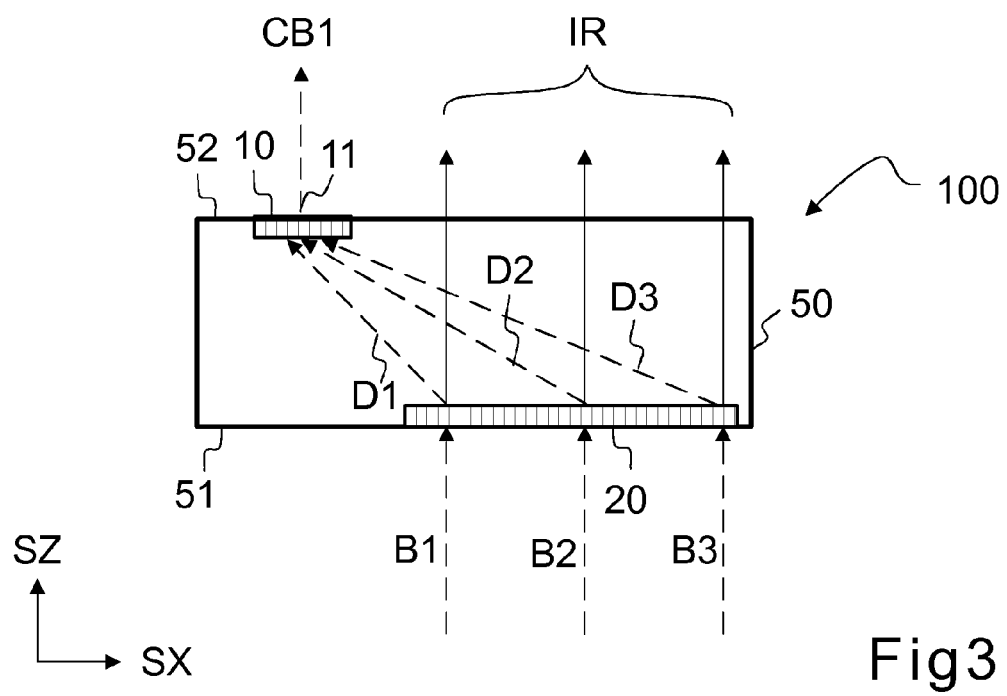
FIG. 3 shows a diffractive beam combiner, wherein input beams are perpendicular to the gratings of said beam combiner.

Referring to FIG. 3, the input light beams B1, B2, B3 impinging on the input grating 20 may be substantially perpendicular to the input grating 20. In other words, the angle $\beta 1$ between the normal N2 of the input grating 20 and the input beam B1 may be substantially equal to zero.

Referring to FIG. 4a, the illuminating unit 400 may comprise a backwards-directing beam combiner 100. The beam combiner 100 may comprise a substantially transparent body. The output grating 10 and the input grating 20 may be implemented on a first surface 51 of the body 50. A second surface 52 of the body 50 may be arranged to reflect the diffracted beams D1, D2, D3 towards the output grating 10. The reflection on the surface 52 may be based e.g. on total internal reflection (TIR). The symbol c3 denotes a distance between the light module 200 and the output beam CB1.

The output and input gratings 10, 20 may be separate or they may be portions of the same substantially uniform grating area.

In particular, the output grating 10 and the input grating 20 may be substantially planar, the output grating 10 and the input grating 20 may be substantially parallel, the output grating 10 and the input grating 20 may have substantially the same grating period, and the reflecting surface 52 may be substantially parallel to the input grating 20. In that case the beams combiner 100 provides the output beam CB1 in a direction, which is opposite the direction of the input beam B1.

The output grating 10 shown in FIG. 4a is transmissive. Referring to FIG. 4b, the output grating 10 may also be reflective. When the output grating 10 of FIG. 4a is replaced with a reflective grating, then the output beam CB1 is provided in the direction of the light beam B1. The thickness of such a beam combiner 100 is approximately 50% of the thickness of the beam combiner shown in FIG. 1. In addition the gratings 10, 20 need to be implemented on only one surface of the body 50, which facilitates manufacturing.

The thickness of the transparent body 50 may be further reduced by arranging the surfaces 51, 52 to reflect the diffracted beams D1, D2, D3 several times before they impinge on the output grating 10.

FIG. 4c shows, in a three dimensional view, propagation of the beams in the beam expander 100. The input grating 20 provides the diffracted beams D1, D2, D3 by diffracting light of the input beams B1, B2, B3. The diffracted beams D1, D2, D3 are reflected from the opposite surface 52 towards the output grating 10. The centerlines of the diffracted beams D1, D2, D3 intersect at the point 11. The output grating 10 diffracts light of the diffracted beams D1, D2, D3 through the transparent body 50 out of said body 50.

The light module 200 may further comprise a common base 280. The light sources 201, 202, 203 may be mounted on the common base 280.

Figure 5:
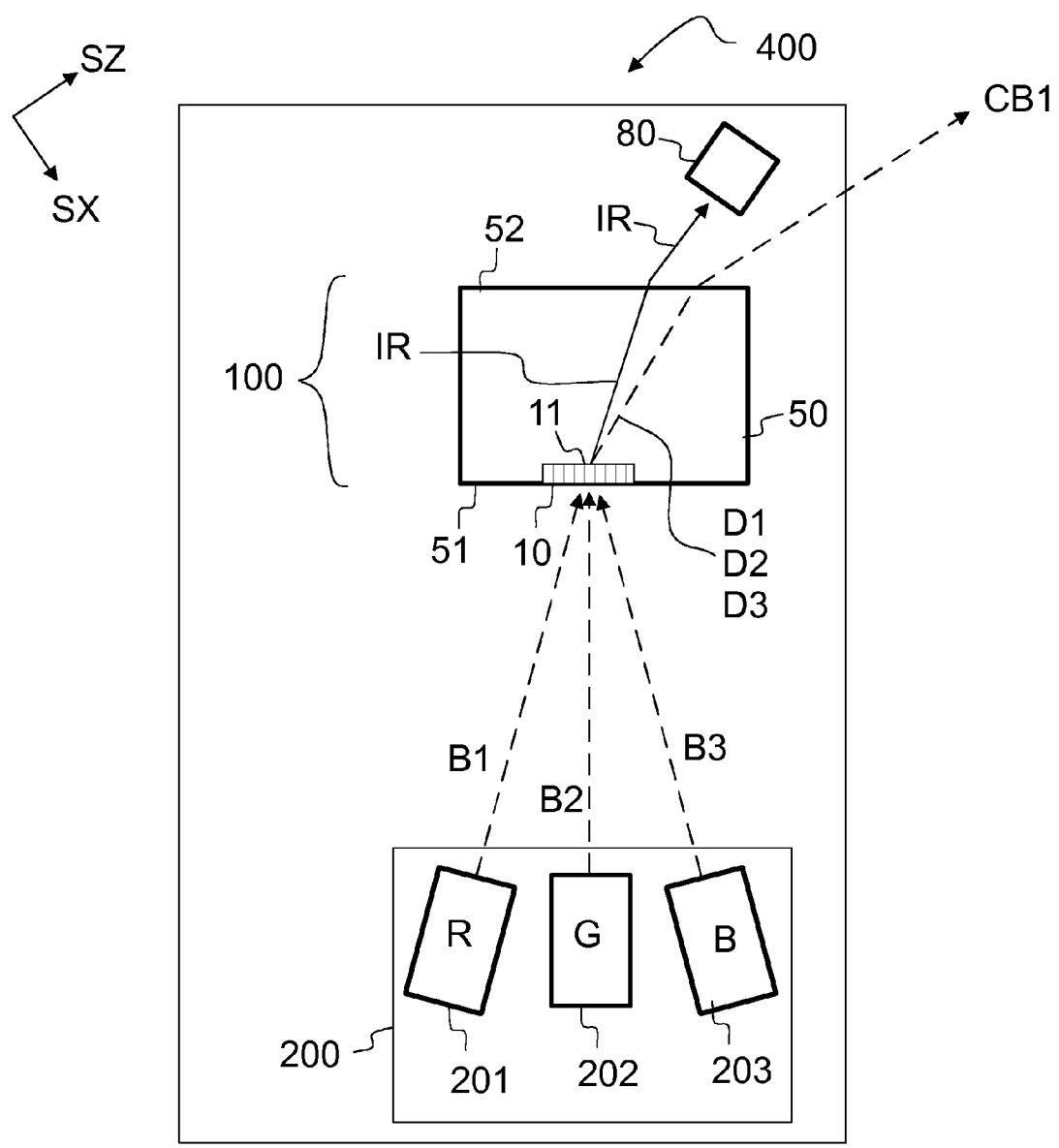
FIG. 5 shows an illuminating unit comprising a beam combiner implemented by a single grating.

Referring to FIG. 5, the beams B1, B2, B3 provided by the light sources 201, 202, 203 may be arranged to intersect at an intersection point 11 also by selecting the orientation of one or more of the light sources 201, 202, 203. The output grating 10 may be arranged in the vicinity of the intersection point 11 so as to form the output beam CB1 by diffracting light of the first beam B1 and by diffracting light of the second beam B2 in the same direction SZ.

In FIG. 5, the transparent body 50 may be replaced by a supporting structure, which is arranged to fix the output grating 10 to a predetermined position.

Referring to FIG. 6, a plurality of grating portions 20a, 20b, 20c may be used instead of a single input grating 20. The grating portions 20a, 20b, 20c may have different grating periods. The diffracted beams D1, D2, D3 provided by the grating portions 20a, 20b, 20c are arranged to intersect in the vicinity of the output grating 10.

Figure 7:
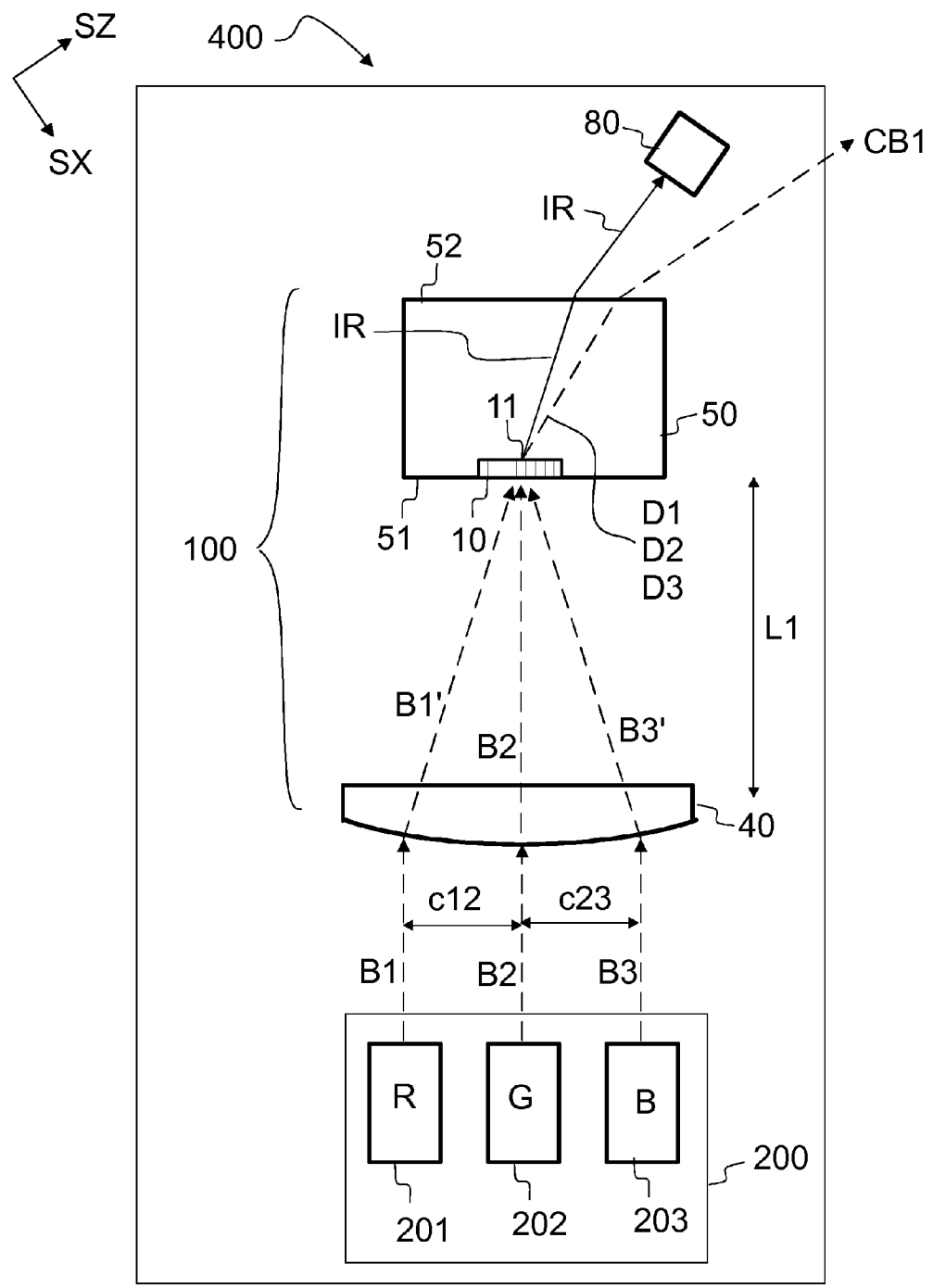
FIG. 7 shows an illuminating unit comprising a beam combiner, which has a lens arranged to refract light of input beams to an intersection point.

Referring to FIG. 7, the beam combiner 100 may further comprise a lens 40, which is arranged to provide at least one deflected beam B1', B3' by refracting light of the input beams B1, B3. The deflected beams B1, B3 and zero or more input beams B2 may be arranged to intersect at an intersection point 11 in the vicinity of the output grating 10.

The position of the intersection point 11 with respect to the output grating 10 may be adjusted e.g. by selecting the distance L1 between the lens 40 and the output grating 10, the focal length of the lens 40, and/or the distances c12, c23 between the input beams B1, B2, B3.

Figure 8:
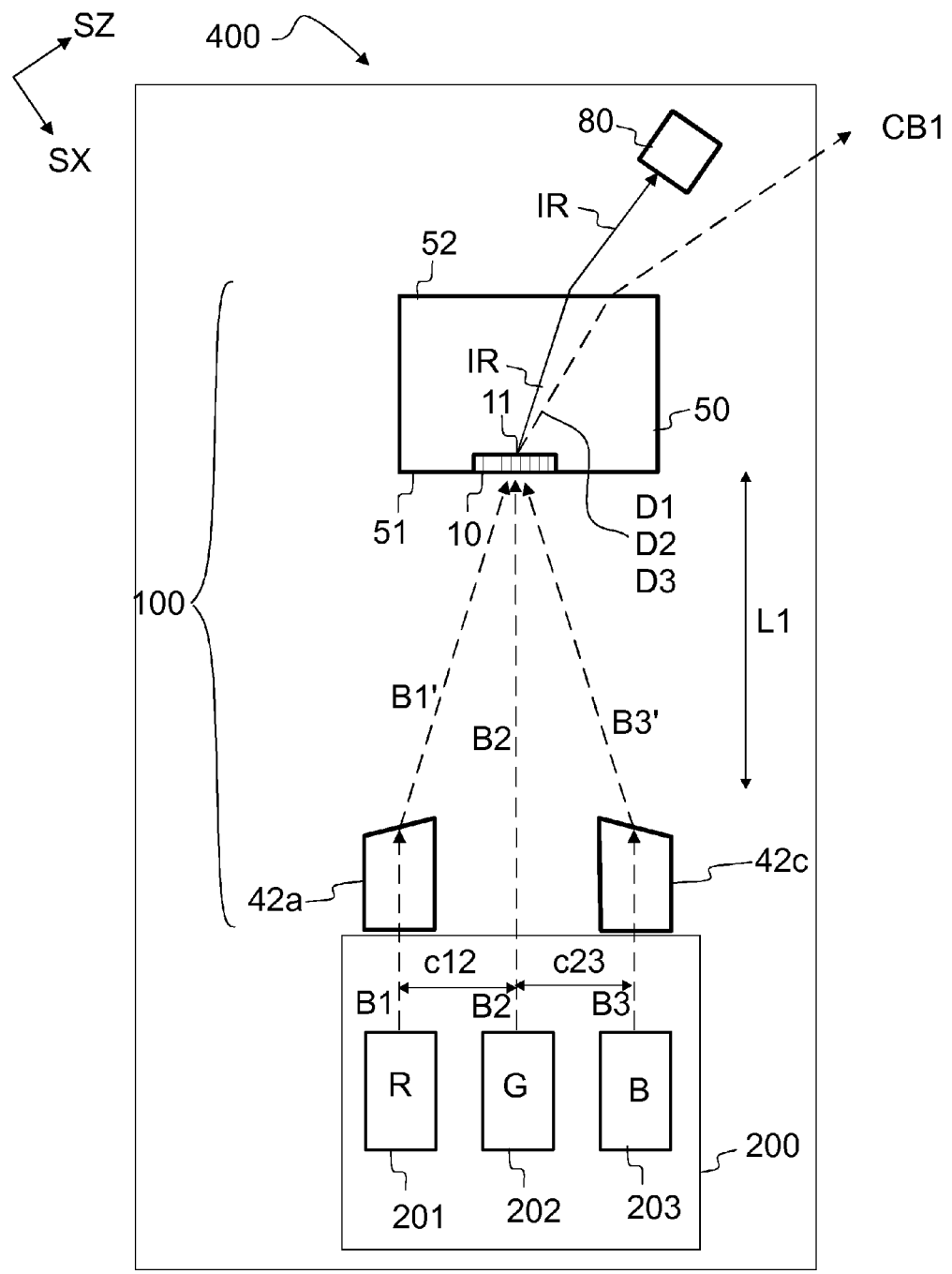
FIG. 8 shows an illuminating unit comprising a beam combiner, which has refractive bodies arranged to refract light of input beams to an intersection point.

Referring to FIG. 8, one or more deflecting bodies 42a 42c, e.g. prisms may be used instead of the lens 40. The deflecting bodies 42a, 42c may comprise a refractive input surface and a refractive output surface, wherein the input surface is not parallel to the output surface.

Figure 9:
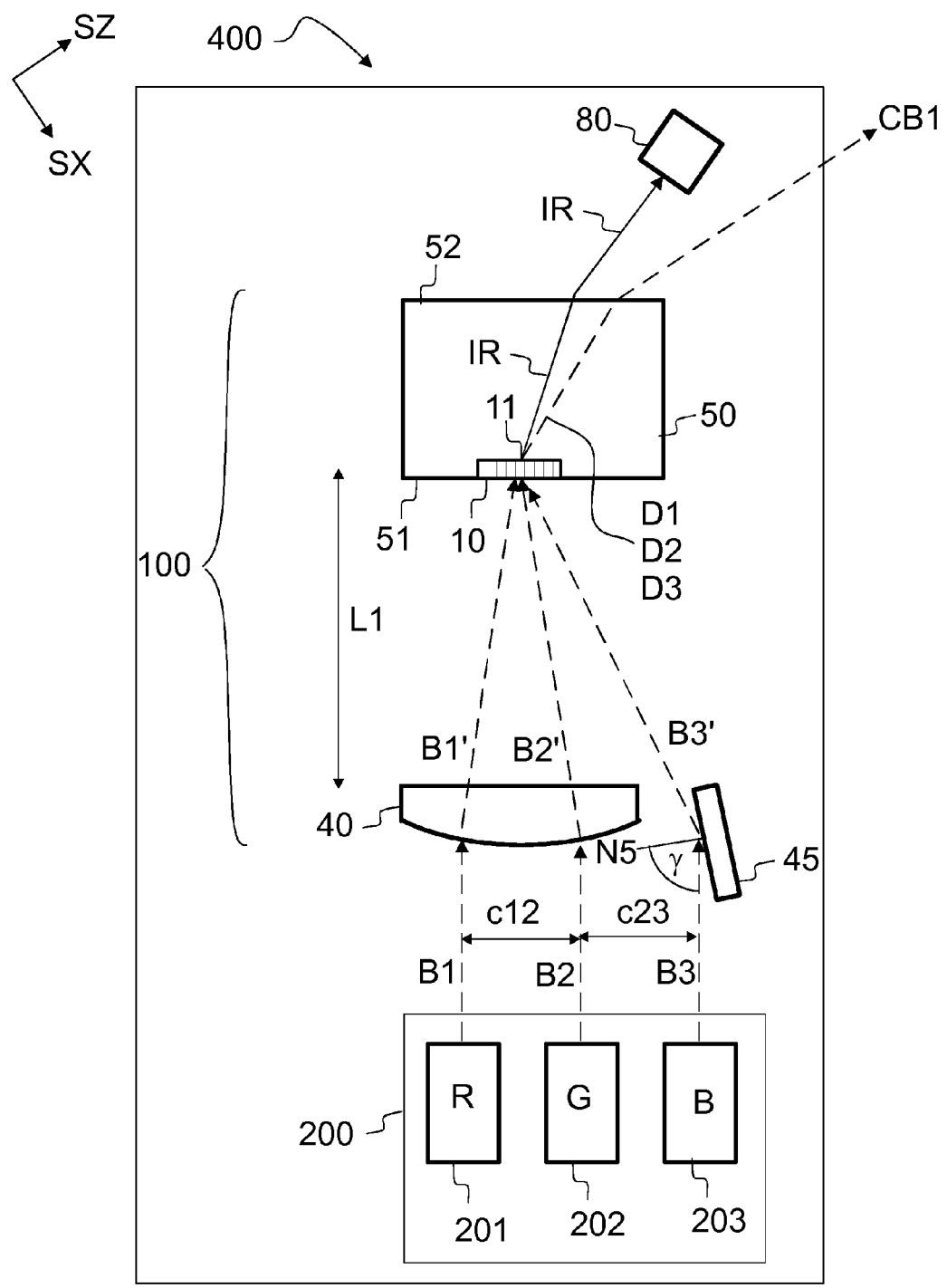
FIG. 9 shows an illuminating unit comprising a beam combiner, which has a reflecting body arranged to reflect light to an intersection point.

Referring to FIG. 9, also reflective structures 45, i.e. mirrors may be used to provide deflected light beams B3'. An angle γ between the normal N5 of the structure 45 and an input beam B3 may be selected such that the deflected beams B1', B2', B3' intersect at the common point 11.

A concave mirror may also be used Instead of the lens 40 shown in FIGS. 7 and 9 to change the direction of at least one of substantially parallel input beams B1 such that intersecting beams B1, B2, B3 are be provided.

Figure 10:
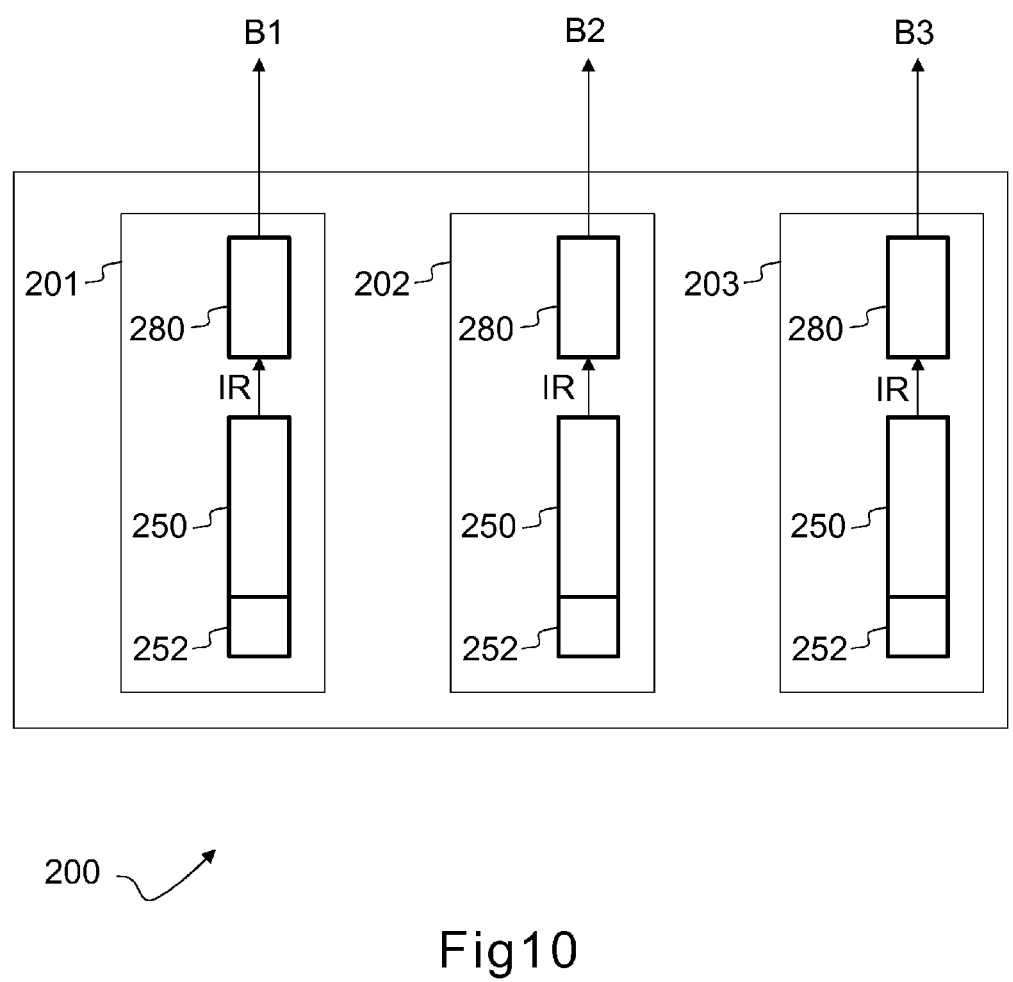
FIG. 10 shows light sources comprising wavelength-conversion crystals.

In particular, the beam combiners 100 described above are suitable for use in combination with light sources shown in FIG. 10. Referring to FIG. 10, a light source 201 may comprise a primary light source 250, which is arranged to provide infrared light. The infrared light is coupled to a nonlinear crystal 280 or nonlinear medium, which is arranged to double or triple the optical frequency of the infrared light. The nonlinear crystal 280 is arranged to convert at least a part of the power of the infrared light into visible light, i.e. the nonlinear crystal is arranged to provide visible light B1, B2, B3 based on conversion of optical frequency.

A drawback of the light sources 201, 202, 203 according to FIG. 10 is that the generated light beams B1 may comprise infrared light in addition to visible light. As discussed above, the beam combiner 100 may be arranged to separate infrared light from visible light. Thus, the beam combiners 100 described above are suitable for use in combination with light sources 201, 202, 203, which are based on conversion of optical frequency.

The light source 201 may further comprise a saturable semiconductor absorber (SESAM), which is arranged to modulate the intensity of the infrared radiation. Consequently, the source may be adapted to emit short light pulses at a high repetition rate. The repetition rate of the pulses may be e.g. in the order of 100 MHz to 100 GHz. The successive pulses may have a short coherence length and they may be substantially non-coherent with respect to each other. Consequently, the pulsed substantially incoherent light creates a lower speckle contrast than light provided by a continuously operating laser. An image formed by coherent light typically creates annoying speckle patterns when viewed visually.

An image display device 500 (See FIGS. 11-12b) may comprise light sources 201, 202, 203 according to FIG. 10. Visible light provided by the light source 201, 202, 203 may also be further modulated at a lower frequency, e.g. at a frequency in the range of 1 kHz to 50 MHz in order to display images.

Suitable light sources 201, 202, 203 based on frequency conversion are disclosed e.g. in WO2008/087253.

Figure 11:
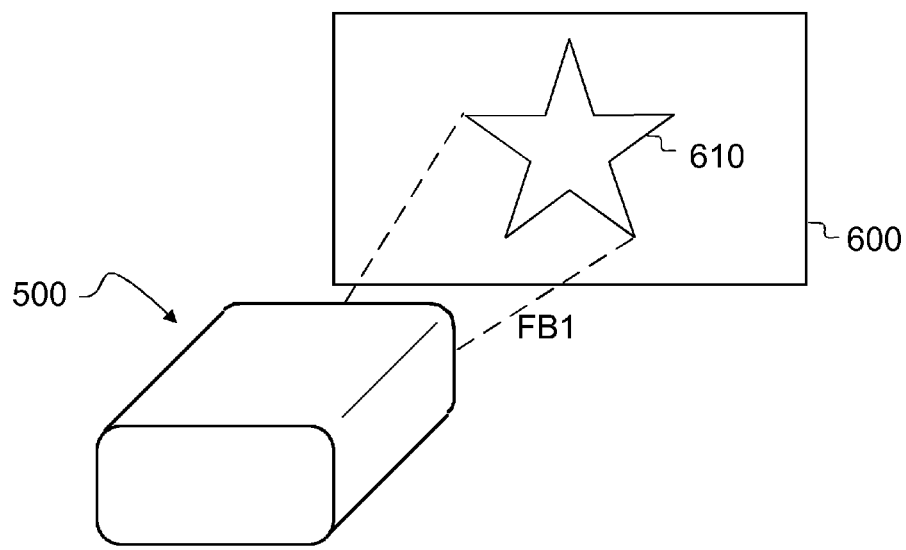
FIG. 11 shows, in a three-dimensional view, an image projector.

Referring to FIG. 11, an image projecting device 500 may be adapted to project light rays FB1 onto an external screen 600 in order to display an image 610 to be viewed by one or more persons. The image 610 may be a still image or a video image.

Referring to FIG. 12a, the image projecting device 500 may comprise an illuminating unit 400, an optical spatial integrator 530, a condenser 540, a modulator 550, and projecting optics 560. The illuminating unit 400 may be a light emitting device 400 according to the present invention. The light source 400 may provide a spatially non-uniform beam of visible light B2. The light beam CB1 is made uniform in the spatial integrator 530, which may be e.g. an optical fiber having a sufficient length. The integrator 530 may provide a substantially uniform beam which is directed to the modulator 550 by the condenser 540. The condenser 540 may be implemented e.g. by one or more lenses or mirror surfaces. The condenser 540 may also be adapted to act as a collimator. The modulator 550 may be e.g. a two-dimensional miniature liquid crystal display or an array of micromechanically moved mirrors (MEMS display). A reflective set-up may be used instead of the transmissive arrangement shown in FIG. 12a. Illuminated pixels generated by the modulator 550 are subsequently imaged to the screen 600 by the projecting optics 560. The projecting optics 560 may be implemented by one or more lenses or mirror surfaces. The projecting device 500 may further comprise an actuator 520 to adjust the distance between the array 550 and the optics 560, in order to focus the projected image 620. The illuminating unit 400, the modulator 550 and the focusing actuator 520 may be controlled by a control unit 510.

The illuminating unit 400 may be arranged to sequentially change the color of the output beam CB1. For example, the output beam CB1 may be red during a first time period, the output beam CB1 may be green during a second subsequent time period, and the output beam CB1 may be green during a third time period. The image projecting device 500 may comprise a single two-dimensional modulator array 550 which is sequentially illuminated by different colors. Thus, images of different colors may be sequentially projected onto the screen 600 such that a viewer perceives the sequentially projected monochromatic images as a single multi-color image 610.

The device 500 of FIG. 12a may also be arranged to display a virtual image instead of a projected image by changing the focusing of the optics such that each pixel of the modulator array 550 corresponds to a substantially collimated beam FB1. When the light rays FB1 impinge on the viewer's eye, the rays created an impression of a virtual image displayed at an infinite distance from the viewer. In other words, the image projecting device 500 of FIG. 12a may also be arranged to operate as a virtual display device.

When the image display device of FIG. 12a is arranged to display virtual images, the intensity of the light rays FB1 may be reduced to a safe level in order to avoid eye damage.

Referring to FIG. 12b, an image projecting device 500 may comprise an illuminating unit 400, whose combined light beam CB1 is focused on an external screen 600 by imaging optics 560. FB1 denotes herein the focused light beam. The position of a focused point P1 on the screen 600 may be varied by one or more beam-directing devices 571, 573. The beam-directing devices may be e.g. turning mirrors or prisms which have one or more reflecting or refracting facets.

Turning of a first mirror 571 moves the focused point P1 substantially in the direction SX, i.e. changes the x-coordinate of said focused point P1. Turning of a second mirror 573 moves the focused point P1 substantially in the direction SY, i.e. changes the y-coordinate of said focused point P1. The mirrors 571, 573 may be moved by actuators 572, 574.

An image 610 may be displayed by adjusting the intensity of the output beam CB1 provided by the light emitting device 400 according to the horizontal position x and vertical position y of the focused point P1. The intensity may be adjusted by modulating the bias voltage of one or more saturable absorbers 252 (See FIG. 11). A control unit 510 may be adapted to control the intensity according to the position of the focused point P1. The control unit 510 may be directly or indirectly coupled to the saturable absorbers 252 to control the intensity of each light source 201, 202, 203 separately. The control unit 510 may be directly or indirectly coupled to the actuators 572, 574 to set the position of the focused point P1 and/or to receive a position signal from said actuators or position sensors. The image 610 is formed of a plurality of image points P1. For example, the image 610 may be formed of image points P1 arranged as a 1920×1080 array in order to display high definition television (HDTV) images.

The beam directing device 571 and/or 573 may be e.g. a rotating mirror or prism. The beam directing device 571 and/or 573 may also be e.g. a fast micro electromechanical (MEMS) mirror, an acousto-optic deflector, or a rotating or moving holographic deflector.

The various aspects of the invention are illustrated by the following examples:

EXAMPLE 1

An illuminating device (400) comprising:
a first light source (201) arranged to provide a first light beam (B1) having a first color (R),
a second light source (202) arranged to provide a second light beam (B2) having a second color (G),
an input grating (20) arranged to form a first diffracted light beam (D1) by diffracting light of said first light beam (B1), and to form a second diffracted light beam (D2) by diffracting light of said second light beam (B1), such that the centerline of said first diffracted beam (D1) and the centerline of said second diffracted beam (D2) are arranged to intersect at an intersection point (11), and
a diffractive output grating (10) located in the vicinity of said intersection point (11), wherein said diffractive output grating (10) is arranged to form an output light beam (CB1) by diffracting light of said first diffracted beam (D1) and light of said second diffracted beam (D2) substantially in the same direction (SZ).

EXAMPLE 2

The illuminating device (400) of example 1 wherein said input grating (10) is substantially parallel to said output grating (20), and the grating period of said input grating (20) is substantially equal to the grating period of said output grating (10).

EXAMPLE 3

The illuminating device (400) of example 2 wherein said first light beam (B1) and said second light beam (B2) are substantially parallel.

EXAMPLE 4

The illuminating device (400) according to any of the examples 1 to 3 wherein said output grating (10) and said input grating (20) are in different planes (51, 52).

EXAMPLE 5

The illuminating device (400) according to any of the examples 1 to 3 wherein said output grating (10) and said input grating (20) are in the same plane (51), and said device (500) further comprises a reflective surface (52) arranged to reflect said first diffracted beam (D1) and said second diffracted beam (D2) towards said output grating (10).

EXAMPLE 6

The illuminating device (400) according to any of the examples 1 to 5 wherein said light sources (201, 202) are arranged to emit infrared radiation (IR) in addition to emitting visible light (R, G), and said input grating (20) and/or said output grating (10) are/is arranged to transmit or reflect said infrared radiation (IR) along a path which is different from the path of said output beam (CB1).

EXAMPLE 7

The illuminating device (400) according to any of the examples 1 to 6 wherein said output grating (10) is further arranged to diffract light of a third light source (203) in the direction (SZ) of said output beam (CB1).

EXAMPLE 8

The illuminating device (400) according to any of the examples 1 to 7, wherein said light sources (201, 202, 203) comprise a wavelength conversion crystal (280).

EXAMPLE 9

An image display device (500) comprising the illuminating device (400) according to any of the examples 1 to 8.

For the person skilled in the art, it will be clear that modifications and variations of the devices according to the present invention are perceivable. The figures are schematic. The particular embodiments described above with reference to the accompanying drawings are illustrative only and not meant to limit the scope of the invention, which is defined by the appended claims.

The invention claimed is:

1. An image display device comprising:
   a first light source arranged to provide a first input light beam having a first color;
   a second light source arranged to provide a second input light beam having a second color;
   at least one transmissive input grating implemented on a substantially transparent body; and
   an output grating implemented on the transparent body,
   wherein the at least one input grating is arranged to provide a first diffracted beam by diffracting light of the first input beam, and to provide a second diffracted beam by diffracting light of the second input beam such that the diffracted beams propagate in the transparent body, a centerline of the first diffracted light beam intersects with a centerline of the second diffracted light beam at an intersection point, wherein a distance between the intersection point and the output grating is smaller than or equal to 50% of a full width at half maximum width of the first input beam, and the output grating is arranged to form an output light beam by diffracting light of the first diffracted light beam and light of the second diffracted light beam substantially in a same direction, wherein said full-width-at-half-maximum width is determined by points where intensity of said first input beam reaches 50% of a maximum intensity of said first input beam.

2. The image display device according to claim 1, wherein the output grating is substantially parallel to the at least one input grating, the at least one input grating has been implemented on a first surface of the transparent body, and the output grating has been implemented on a second surface of the transparent body.

3. The image display device according to claim 2, wherein the output grating is a transmissive grating.

4. The image display device according to claim 1, wherein said output grating and said input grating are in a same plane, said image display device further comprising:
   a reflective surface arranged to reflect said first light beam and said second light beam towards said output grating.

5. The image display device according to claim 4, wherein a second surface of the transparent body is arranged to reflect the diffracted beams towards the output grating by total internal reflection.

6. The image display device according to claim 1, wherein said first and second light sources are arranged to emit infrared radiation in addition to emitting visible light, said image display device further comprising:
   a beam dump arranged to absorb infrared radiation transmitted through a portion of a surface of the transparent body.

7. The image display device according to claim 1, wherein said first and second light sources are arranged to emit infrared radiation in addition to emitting visible light, and at least one of said gratings is arranged to transmit or reflect said infrared radiation along a path which is different from the path of said output beam.

8. The image display device according to claim 1, wherein said output grating is further arranged to diffract light of a third light source in the direction of said output beam.

9. The image display device according to claim 1 wherein said first and second light sources comprise a wavelength conversion crystal.

10. The image display device according to claim 1, wherein the first input light beam has red color, and the second input light beam has green color.

11. A method for displaying images, said method comprising:
    providing a first input light beam having a first color;
    providing a second input light beam having a second color;
    using at least one transmissive input grating to provide a first diffracted beam by diffracting light of the first input beam, and to provide a second diffracted beam by diffracting light of the second input beam such that a centerline of the first diffracted light beam intersects with a centerline of the second diffracted light beam at an intersection point; and
    using an output grating to form an output light beam by diffracting light of the first diffracted light beam and by diffracting light of the second diffracted light beam substantially in the same direction,
    wherein the input and output gratings have been implemented on a transparent body such that the diffracted beams propagate in the transparent body, and such that a distance between the intersection point and the output grating is smaller than or equal to 50% of a full width at half maximum width of the first input beam, wherein said full-width-at-half-maximum width is determined by points where intensity of said first input beam reaches 50% of a maximum intensity of said first input beam.

12. The method according to claim 11, further comprising:
    varying an angle between the normal of an input grating and the direction of the output light beam in order to minimize the width of the output beam.

13. The method according to claim 11, wherein the first input light beam has red color, and the second input light beam has green color.

14. An illuminating device, comprising:
    a first light source arranged to provide a first input light beam having a first color;
    a second light source arranged to provide a second input light beam having a second color;
    at least one transmissive input grating implemented on a transparent body; and
    an output grating implemented on the transparent body,
    wherein the one or more input gratings are arranged to provide a first diffracted beam by diffracting light of the first input beam, and to provide a second diffracted beam by diffracting light of the second input beam such that the diffracted beams propagate in the transparent body, a centerline of the first diffracted light beam intersects with a centerline of the second diffracted light beam at an intersection point, wherein a distance between the intersection point and the output grating is smaller than or equal to 50% of a full width at half maximum width of the first input beam, and the output grating is arranged to form an output light beam by diffracting light of the first diffracted light beam and light of the second diffracted light beam substantially in the same direction, wherein said full-width-at-half-maximum width is determined by points where intensity of said first input beam reaches 50% of a maximum intensity of said first input beam.

15. A method for providing an illuminating light beam, the method comprising:
    providing a first input light beam having a first color;
    providing a second input light beam having a second color;

using one or more transmissive input gratings to provide a first diffracted beam by diffracting light of the first input beam, and to provide a second diffracted beam by diffracting light of the second input beam such that a centerline of the first diffracted light beam intersects with a centerline of the second diffracted light beam at an intersection point; and using an output grating to form an output light beam by diffracting light of the first diffracted light beam and by diffracting light of the second diffracted light beam substantially in a same direction, wherein the input and output gratings have been implemented on a transparent body such that the diffracted beams propagate in the transparent body, and a distance between the intersection point and the output grating is smaller than or equal to 50% of a full width at half maximum width of the first input beam, wherein said full-width-at-half-maximum width is determined by points where intensity of said first input beam reaches 50% of a maximum intensity of said first input beam.

* * * * *